US010152901B2

(12) United States Patent
Angelescu

(10) Patent No.: US 10,152,901 B2
(45) Date of Patent: Dec. 11, 2018

(54) ORIENTATION ZOOM IN NAVIGATION MAPS WHEN DISPLAYED ON SMALL SCREENS

(71) Applicant: AUDI AG, Ingolstadt (DE)

(72) Inventor: Emanuel Angelescu, Cologne (DE)

(73) Assignee: AUDI AG, Ingolstadt (DE)

( * ) Notice: Subject to any disclaimer, the term of this patent is extended or adjusted under 35 U.S.C. 154(b) by 147 days.

(21) Appl. No.: 14/783,151

(22) PCT Filed: Mar. 28, 2014

(86) PCT No.: PCT/EP2014/000844
§ 371 (c)(1),
(2) Date: Oct. 8, 2015

(87) PCT Pub. No.: WO2014/166599
PCT Pub. Date: Oct. 16, 2014

(65) Prior Publication Data
US 2016/0055769 A1 Feb. 25, 2016

(30) Foreign Application Priority Data

Apr. 8, 2013 (DE) .................. 10 2013 006 026

(51) Int. Cl.
G09B 29/10 (2006.01)
G01C 21/36 (2006.01)
(Continued)

(52) U.S. Cl.
CPC ........... *G09B 29/106* (2013.01); *G01C 21/00* (2013.01); *G01C 21/367* (2013.01);
(Continued)

(58) Field of Classification Search
CPC .. G01C 21/00; G01C 21/3664; G01C 21/367; G01C 21/3676; G06F 3/0488; G09B 29/106
See application file for complete search history.

(56) References Cited

U.S. PATENT DOCUMENTS 5,519,392 A * 5/1996 Oder ..................... G01C 21/22
340/990
5,559,707 A * 9/1996 DeLorme ............... G01C 21/20
340/990
(Continued)

FOREIGN PATENT DOCUMENTS

CN 1664772 9/2005
DE 19909385 9/2000
(Continued)

OTHER PUBLICATIONS

German Office Action for German Priority Patent Application No. 10 2013 006 026.5, dated Nov. 25, 2013, 7 pages.
(Continued)

Primary Examiner — Michael J Jansen, II
(74) Attorney, Agent, or Firm — Staas & Halsey LLP

(57) ABSTRACT

A method and an apparatus facilitate the orientation of a user in a virtual environment. This involves a user initiating a change between two views of the virtual environment. A first view provides a detailed representation of a destination and a second view is scaled such that both the destination and a reference point, such as a current position, are presented together.

15 Claims, 2 Drawing Sheets

(51) Int. Cl.
*G01C 21/00* (2006.01)
*G06F 3/0488* (2013.01)

(52) U.S. Cl.
CPC ..... *G01C 21/3664* (2013.01); *G01C 21/3676* (2013.01); *G06F 3/0488* (2013.01)

(56) References Cited

U.S. PATENT DOCUMENTS

| | | | | |
|---|---|---|---|---|
| 6,138,072 A * | 10/2000 | Nagai | G01C 21/3679 | 340/988 |
| 6,178,380 B1 * | 1/2001 | Millington | G01C 21/367 | 340/990 |
| 7,327,349 B2 * | 2/2008 | Robbins | G06F 3/0481 | 345/156 |
| 7,519,469 B2 * | 4/2009 | de Silva | G01C 21/36 | 340/995.17 |
| 7,546,188 B2 * | 6/2009 | Nezu | G01C 21/3664 | 701/36 |
| 7,737,951 B2 * | 6/2010 | Pinkus | G01C 21/362 | 345/169 |
| 7,839,306 B2 * | 11/2010 | Tanizaki | G09B 29/10 | 340/995.1 |
| 8,185,267 B2 * | 5/2012 | Nezu | G01C 21/36 | 340/995.1 |
| 8,237,744 B2 * | 8/2012 | Joachim | G01C 21/367 | 345/600 |
| 8,300,068 B2 * | 10/2012 | Yamada | G01C 21/36 | 340/995.14 |
| 8,314,789 B2 * | 11/2012 | Fitzmaurice | G06F 3/04815 | 345/419 |
| 8,365,074 B1 * | 1/2013 | Wagner | G06F 3/0488 | 345/661 |
| 8,370,059 B2 * | 2/2013 | Sakai | G01C 21/3673 | 345/625 |
| 8,607,167 B2 * | 12/2013 | Matas | G01C 21/3664 | 345/173 |
| 8,706,415 B2 * | 4/2014 | Su | G01C 21/3632 | 701/400 |
| 8,788,203 B2 * | 7/2014 | Su | G01C 21/3632 | 340/995.15 |
| 8,830,190 B2 * | 9/2014 | Nagasaka | G01C 21/3664 | 178/18.01 |
| 8,907,886 B2 * | 12/2014 | Robbins | G06F 3/0481 | 345/156 |
| 9,047,691 B2 * | 6/2015 | van Os | G01C 21/3611 | |
| 9,080,885 B2 * | 7/2015 | Kocienda | G01C 21/26 | |
| 9,135,751 B2 * | 9/2015 | Moore | G01C 21/3638 | |
| 9,200,915 B2 * | 12/2015 | Vulcano | G01C 21/36 | |
| 9,256,355 B1 * | 2/2016 | Tseng | G06F 1/1624 | |
| 9,273,979 B2 * | 3/2016 | Su | G01C 21/3632 | |
| 9,311,750 B2 * | 4/2016 | Moore | G01C 21/00 | |
| 9,367,959 B2 * | 6/2016 | Forstall | G01C 21/3638 | |
| 9,507,513 B2 * | 11/2016 | Gordon | G06F 3/04883 | |
| 9,569,066 B2 * | 2/2017 | Van Lancker | G06F 3/04815 | |
| 9,582,173 B1 * | 2/2017 | Wagner | G06F 3/0488 | |
| 9,753,610 B2 * | 9/2017 | Nezu | G01C 21/3664 | |
| 9,846,051 B2 * | 12/2017 | Stoschek | G01C 21/3635 | |
| 9,857,193 B2 * | 1/2018 | Vulcano | G01C 21/36 | |
| 9,891,068 B2 * | 2/2018 | Vulcano | G01C 21/36 | |
| 2005/0096812 A1 * | 5/2005 | Nezu | G01C 21/3664 | 701/36 |
| 2005/0195154 A1 * | 9/2005 | Robbins | G06F 3/0481 | 345/156 |
| 2006/0025920 A1 * | 2/2006 | Nezu | G01C 21/36 | 701/532 |
| 2006/0220923 A1 | 10/2006 | Tanizaki et al. | | |
| 2006/0247855 A1 * | 11/2006 | de Silva | G01C 21/36 | 701/454 |
| 2007/0103445 A1 * | 5/2007 | Pinkus | G01C 21/362 | 345/173 |
| 2007/0106464 A1 * | 5/2007 | Yamada | G01C 21/36 | 701/532 |
| 2007/0233371 A1 * | 10/2007 | Stoschek | G01C 21/3635 | 701/533 |
| 2008/0168396 A1 * | 7/2008 | Matas | G01C 21/3664 | 715/840 |
| 2009/0043493 A1 * | 2/2009 | Sakai | G01C 21/367 | 701/408 |
| 2009/0046111 A1 | 2/2009 | Joachim et al. | | |
| 2009/0079732 A1 * | 3/2009 | Fitzmaurice | G06F 3/04815 | 345/419 |
| 2009/0128483 A1 * | 5/2009 | Robbins | G06F 3/0481 | 345/156 |
| 2010/0079413 A1 * | 4/2010 | Kawashima | B60K 35/00 | 345/175 |
| 2010/0302281 A1 * | 12/2010 | Kim | G06F 3/04883 | 345/661 |
| 2011/0029239 A1 * | 2/2011 | Okude | G01C 21/367 | 701/431 |
| 2011/0074811 A1 * | 3/2011 | Hanson | G06T 11/00 | 345/629 |
| 2011/0320117 A1 | 12/2011 | Sempuku et al. | | |
| 2012/0098769 A1 * | 4/2012 | Nagasaka | G01C 21/3664 | 345/173 |
| 2012/0098770 A1 * | 4/2012 | Nagasaka | G01C 21/3664 | 345/173 |
| 2012/0254804 A1 * | 10/2012 | Sheha | G06Q 30/02 | 715/834 |
| 2012/0303268 A1 * | 11/2012 | Su | G01C 21/3632 | 701/428 |
| 2012/0303273 A1 * | 11/2012 | Su | G01C 21/3632 | 701/533 |
| 2012/0303274 A1 * | 11/2012 | Su | G01C 21/3632 | 701/533 |
| 2013/0080973 A1 * | 3/2013 | Nezu | G01C 21/3664 | 715/810 |
| 2013/0086517 A1 | 4/2013 | Van Lancker et al. | | |
| 2013/0311082 A1 * | 11/2013 | Stoschek | G01C 21/3635 | 701/428 |
| 2013/0321402 A1 * | 12/2013 | Moore | G01C 21/3611 | 345/419 |
| 2013/0321466 A1 * | 12/2013 | Kocienda | G01C 21/26 | 345/635 |
| 2013/0325319 A1 * | 12/2013 | Moore | G01C 21/36 | 701/412 |
| 2013/0325341 A1 * | 12/2013 | van Os | G01C 21/3611 | 701/533 |
| 2013/0326384 A1 * | 12/2013 | Moore | G01C 21/3638 | 715/771 |
| 2013/0326425 A1 * | 12/2013 | Forstall | G01C 21/3638 | 715/851 |
| 2014/0365120 A1 * | 12/2014 | Vulcano | G01C 21/36 | 701/532 |
| 2014/0365124 A1 * | 12/2014 | Vulcano | G01C 21/36 | 701/533 |
| 2014/0365126 A1 * | 12/2014 | Vulcano | G01C 21/36 | 701/533 |
| 2015/0186026 A1 * | 7/2015 | Gordon | G06F 3/04883 | 345/173 |
| 2015/0212712 A1 * | 7/2015 | Robbins | G06F 3/0481 | 715/788 |
| 2016/0055769 A1 * | 2/2016 | Angelescu | G09B 29/106 | 345/173 |

FOREIGN PATENT DOCUMENTS

| | | |
|---|---|---|
| DE | 102005052878 | 5/2007 |
| DE | 102005054581 | 5/2007 |
| DE | 102007018073 | 10/2008 |
| DE | 102007038464 | 2/2009 |
| DE | 10 2013 006 026.5 | 4/2013 |
| EP | 1850092 | 10/2007 |
| EP | 2026038 | 2/2009 |

(56) References Cited

FOREIGN PATENT DOCUMENTS

JP              8-61964      3/1996
WO  PCT/EP2014/000844    3/2014

OTHER PUBLICATIONS

English language International Search Report for PCT/EP2014/000844, dated Jun. 18, 2014, 2 pages.
WIPO English language translation of the International Preliminary Report on Patentability for PCT/EP2014/000844, downloaded from WIPO website on Oct. 8, 2015, 12 pages.
Chinese Office Action dated Dec. 28, 2017 in corresponding Chinese Patent Application No. 201480018945.4.

* cited by examiner

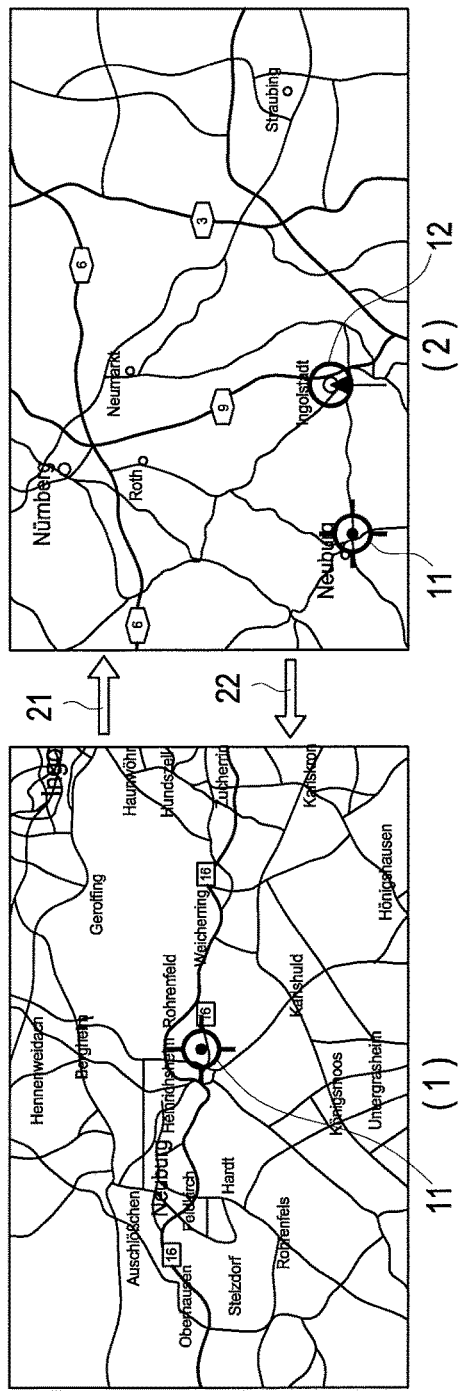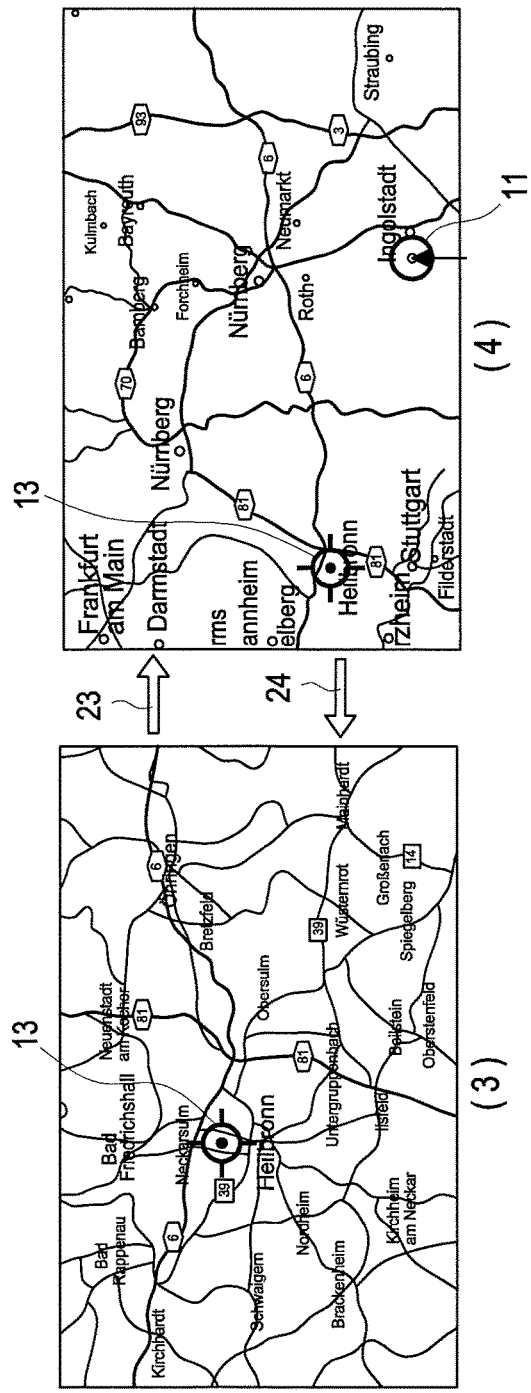

ORIENTATION ZOOM IN NAVIGATION MAPS WHEN DISPLAYED ON SMALL SCREENS

CROSS REFERENCE TO RELATED APPLICATIONS

This application is based on and hereby claims priority to International Application No. PCT/EP2014/000844 filed on Mar. 28, 2014 and German Application No. 10 2013 006 026.5 filed on Apr. 8, 2013, the contents of which are hereby incorporated by reference.

BACKGROUND

The present method according to the invention and the present apparatus according to the invention relate to orientation assistance in a virtual environment.

During a navigation in a virtual environment presented on a display unit, particularly during navigation in geographical maps that takes place using a plurality of different scales, a respective user can easily become disoriented, particularly when a small screen is used as the display unit.

In the related art today, digital map material is presented on a screen in different sizes and resolutions. This always involves the user selecting a particular map detail for presentation. This is accomplished either by moving the whole map in the background in relation to a detail that is visible on the screen or by moving the detail itself over the whole map. As additional interaction options in comparison with conventional navigation maps in printed form, the user can set a desired map scale or a zoom level in order to increase or reduce the level of detail for a current view.

US 2009/0046111 A1 discloses a method for computing route guidance in road traffic that comprises the following:
a) determining the user's own position and autonomously executing a first working mode;
b) autonomously changing the scaling of the route guidance that is presented on a display unit, i.e. changing the scaling on the basis of the frequency by which the user's own position changes and/or
c) autonomously changing the scaling of the route guidance that is presented on the display unit by manipulating the display unit, based on the user's own position and taking into account properties of the respective route guidance when a second working mode is selected.

Furthermore, US 2009/0046111 A1 has provision for the respective user to be able to choose between two working modes, the first mode providing a detailed representation of the current position on the respective route guidance and the second mode affording an additional overview of a section of the respective route guidance that is still to be negotiated. In this case, the respective user can choose between the two modes at any time without restriction by controlling the display.

In addition, DE 10 2005 052 878 A1 discloses a method for presenting graphic information on a display that involves, in a first mode, an object having variable geographical coordinates and a first map detail, which comprises the geographical coordinates of the object, being presented on the display, wherein the geographical coordinates of the objects are assigned to a predefined position of the display when the presentation on the display is updated. In addition, a second mode is disclosed that involves a map detail being presented on the display in unaltered form while the geographical position of the object changes. This second mode therefore avoids map scrolling with an associated high system encumbrance. In this case, a change between the first and second modes can be initiated automatically or manually, the change being able to take place both from the first mode to the second mode and vice versa.

DE 10 2007 108 073 A1 discloses a method for displaying a digital map in a vehicle by a display, wherein a display region of the display can be altered for presentation of a digital map. This is accompanied by the explanation that the presented scale of the digital map remains unaltered when the size of the display region changes. This avoids fresh computation and goes easy on capacities of the computation unit.

A method for vehicle navigation by a roadmap displayed on a display is disclosed in DE 199 09 385 A1. In this case, at the beginning of a journey, determination of the vehicle position and input of the destination of travel initially display a roadmap having such a scale that it displays the vehicle position and the destination of travel. During the journey, as the destination of travel is approached to an increasing degree, the map scale of the map presentation is automatically enlarged such that the full size of the display can always be used to identify the destination of travel and the respective vehicle position on the roadmap.

For orientation of a respective user in a virtual environment presented on a display unit, particularly in geographical maps, difficulties frequently arise when using the related art after a map detail under consideration has been repeatedly displaced. By way of example, it is thus difficult to search for a simple connection between a destination presented in a currently selected map detail and a starting point, i.e. a current location, for example, that is not presented in the currently selected map detail.

Similarly, rough estimation of a distance, for example a linear distance, between a current location and points within the currently selected map detail is an ongoing difficulty if the current location is not visible. Coarse determination of a length of a circuitous route via points within the currently selected map detail is also frequently impossible if the whole route is not visible. In the case of conventional printed maps, although the scale cannot be selected without restriction, it is possible to use a very large map region in comparison with digital maps in which the image detail is limited by the size of the respective screen. This allows very simple orientation and ascertainability in respect of distance and route guidance between an arbitrary number of points.

SUMMARY

The inventor proposes a method that, for orienting a user in a virtual environment presented on a display unit, provides for specific manipulation of a scale for the representation of the virtual environment, wherein at an arbitrary instant of interaction by the user with the virtual environment presented on the display unit, direct access to the display unit by the user prompts a change between at least two views of the virtual environment, the at least two views being presented in different scales on the display and at least one of the at least two views of the virtual environment providing an overview of orientation points in the virtual environment that are significant for the user.

In order to avoid this disorientation, the proposals have provision for direct access to the display unit by the respective user, which means that a presented display on the display unit changes to a defined point within the virtual environment and, when needed, also back again to the original view. That is, in order to afford orientation assistance for the user and to allow a connection from a destination that has been found by the user in a first view, for example, at a large scale or a small scale ratio, such as 1:10, to a starting point that has been determined using a second view with a small scale, i.e. a large scale ratio, such as 1:100,000, the proposed method provides for the user to be able to use a defined input to change directly between the two views presented on a respective display, which facilitates mental orientation of the user. This means that the user can use the direct access provided to make a very quick change between a first, for example highly detailed, view and a second view that is comparatively low on detail as compared with the first view. This allows the user to directly link the highly detailed portion of a map, as presented in the first view, to a respective position in an overview, as presented in a second view, without having to provide an additional input, such as by scrolling and/or zooming that are provided in the prior art. The direct access provided according to the proposals saves both attention and memory resources of the user.

In addition, partly dispensing with zoom and/or scroll movements ensures efficient use of the respective display. A controlled change between defined views of a virtual environment allows the latter to be explored by the respective user in a structured and effective manner without the need to represent a transition from a respective starting location to a respective destination or intermediate destination. By dispensing with the representation of the transition from a respective starting location to a respective destination or intermediate destination, it is possible to explore and if need be link locations that are far apart on small screens or displays too without risking a loss of orientation for the respective user as a result of frequent zooming or scrolling.

In this case, a connection between starting point and destination can be made virtually, in the form of a line or a highlighted route.

A defined input within the context of the method or the apparatus is intended to be understood to mean any suitable method for transmitting a user command to the proposed display. In particular, these are gestures, such as double-tapping on a touch-sensitive portion of the display. In addition, the display can also be provided by a touch-sensitive control panel, such as an MMI Touch®. In a further embodiment of the method or of the apparatus, it is also possible to use a gesturing space. In addition, mechanical input methods, such as rotary and/or pressure-operated switches, or voice commands when a voice dialogue system is used can also be used for input by the user.

A display within the context of the proposed method or the proposed apparatus is intended to be understood to mean a suitable technical device that presents a respective virtual environment. In particular, these may be screens and displays.

Provision is additionally made for the change between the at least two views to be able to be made at any instant of the interaction by the user with the virtual environment and both from the first view, which is a large scale, for example, to the second view, which is a small scale, for example, and vice versa.

This change from the first view to the second view allows the respective user to transfer orientation work that has already been done in the first or the second view to the other view. This means that the user can transfer information, for example from the highly detailed first view, directly to the context of a larger route in the second view, for example. Tediously scrolling back through irrelevant areas and scales and a resultant lack of orientation are no longer necessary.

If the user defines a plurality of destinations or intermediate destinations, it is also possible to access additional views that provide an overview of all the destinations or intermediate destinations. Such views are accessed by the same operating control logic as is also applied when changing between the first view and the second view, with the difference that the change is made between a plurality of views that are scrolled through cyclically, for example, it also being possible, within the cyclic scrolling through the additional views, for input to be used by the user to change forwards and backwards through the cyclic scrolling through the additional views.

In a further embodiment of the method, the at least two views of the at least one virtual environment are scaled such that a first view is an overview of a current location and a second view is an overview of an overall area that lies between a starting point and an end of a route determined by the user.

Automatic scaling of the scale of the second view so that the starting point and the end of a route defined by the respective user are presented allows the respective user to relate his current location to the route at any time and thereby orient himself in a simple and rapid manner. Specifically in road traffic, simple and rapid operator control affords great advantages and makes a considerable contribution to road safety.

In a further embodiment of the method, the at least two views of the at least one virtual environment are scaled such that a first view is an overview of at least one reference point and a second view is an overview of an overall area that lies between the at least one reference point and at least one destination, neither the reference point nor the destination needing to be part of a route. This means that an area per se, for example in respect of points that are of interest to the user, can be presented.

Besides the orientation in a virtual environment for navigation in order to create route guidance with a fixed starting point and end, there is provision for the method also to be used for exploratory processes in the respective virtual environment. This involves the provision of unrestricted selection of destinations that can be related to one another or to at least one further reference point. Such unrestricted selection of destinations or intermediate destinations allows the respective user to explore the whole virtual environment without restriction, regardless of orientation methods already made or route planning by the user. By requesting a further view that is provided using scaling that allows all the selected destinations or intermediate destinations to be presented together with the at least one reference point, any destinations or intermediate destinations explored by virtue of the unrestricted exploration are related to orientation efforts which the respective user has already made. Whereas the process of route planning attaches conditions of many kinds, such as the presence of roads, an area can be explored without restriction regardless of such limitations.

In a further embodiment of the method, the different scales of the at least two views are defined by the user himself.

The problem of a lack of orientation arises not only in connection with an already defined route but also, and to an increased extent, in the case of unrestricted exploration of the respective virtual environment. A reference point that is defined by the user himself and to which the user can change at any time by the defined input precludes "getting lost" in the virtual environment, where the respective user is unable to find a destination or intermediate destination that is important to him in the many available levels and degrees of latitude and longitude.

A reference point that the respective user himself stipulates in the virtual environment and that, by way of example, causes a view in which a fixed scale and fixed degrees of latitude and longitude are preset allows a whole virtual environment to be explored in relation to this reference point and allows the respective user to be oriented in relation to this reference point at any time. Particularly when using small screens, in the case of which small differences in the length or in the intensity of a swipe gesture that is used cause great differences in the view of the virtual environment, such situations involving the loss of overview arise frequently.

One or more selectable reference points and a respective view defined by these reference points can counteract a state of lack of orientation and allow a high level of operator control convenience even on small display units.

In a further embodiment of the method, the direct access, as already mentioned above, is accomplished by a defined input by the user, particularly by gestures.

Since orientation is frequently relevant in a mobile context, an option for defined input by the respective user needs to be optimized so that it can be accomplished without great effort. Particularly in road traffic, the option to make the defined input should be provided quickly and without great attention, i.e. without great distraction from the road traffic. Gestures such as double-tapping are particularly suitable for this task. In addition, forms of input such as touching a touch-sensitive screen or a touch-sensitive control panel can also be provided in a particular way, for example using three fingers at the same time or by touching a defined position on the touch-sensitive screen or the touch-sensitive control panel.

In a further embodiment of the method, the method is carried out in a vehicle.

As already explained, orientation and mobility are closely linked. Therefore, according to a further embodiment of the method, provision is made for said method to be used in a vehicle. Specifically in road traffic, a driver of a respective vehicle cannot be expected to orient himself both on the road and in a virtual environment. Therefore, interaction with the respective virtual environment should take place on an event-oriented basis and quickly. These requirements are met by the method by virtue of its allowing orientation directly and at any time. As a result, the driver can pursue time-consuming and attention-demanding exploration of a respective environment at times at which the driver requires comparatively little concentration for his driving behavior, such as in red light phases, and can reorient himself in a directly selectable view as soon as the respective traffic situation so requires.

In addition, the inventor proposes an apparatus for presenting a virtual environment on a display. The apparatus is used particularly for carrying out the method that is described above.

In one embodiment of the apparatus, the apparatus is used to present different views of a virtual environment. In this case, specific manipulation of a scale on which the presentation of the virtual environment is based by direct access by a user allows a change to be made between at least one first view and at least one second view of the virtual environment. The apparatus comprises at least one display device or display connected to a computation unit and at least one device for sensing the direct access by the user that is in operative contact with the display, the direct access needing to be performed by a user input.

Both the presentation and the rescaling of the scale of the respective presentation of the virtual environment require computations that need to be performed by the computation unit of the apparatus. The computation unit may particularly be a processor that is designed to carry out the necessary computations.

In addition, for the purposes of presenting the virtual environment, the display connected to the computation unit is provided, which can comprise any technically suitable unit, particularly an LCD or LED screen.

The method is particularly suitable for navigation on small screens, since there the risk of a loss of overview is greater than is the case with larger screens.

In a further embodiment of the apparatus, the device for sensing the input by the user is a touch-sensitive sensor.

In order to sense the input by the user, it is possible to use any technically suitable unit, particularly a touch-sensitive screen (touchscreen), a touch-sensitive panel (touchpad) or a mechanical apparatus, such as a rotary and/or pressure-operated switch. In addition, a voice recognition system can be used, which receives the input by the user in the form of speech.

In a further embodiment of the apparatus, the apparatus is embodied as a navigation appliance.

It has already been explained that efficient orientation in a mobile context and particularly in a vehicle is of great importance to the operator control convenience and the safety of the respective user. In order to use the method or the apparatus in a vehicle, provision is made for the method and the apparatus to be integrated into a navigation appliance or at least to be coupled thereto and thereby for operator control of the navigation appliance to be optimized.

In a further embodiment of the apparatus, the apparatus is arranged in a vehicle.

When the method is carried out on a mobile terminal, the latter can be used either in a pedestrian realm or in a vehicle realm or in any other mobile context. Specifically when the apparatus or the method is used in a vehicle, the advantages of the apparatus or of the method can be used and optimized orientation for the respective user in a virtual environment can be made possible.

In this case, according to a further embodiment, provision is also made for it to be possible to change an operator control apparatus, for example from a vehicle-based system to a mobile terminal and back again.

Further advantages and embodiments will emerge from the description and the accompanying drawing.

It goes without saying that the features cited above and those yet to be explained below can be used not only in the respectively indicated combination but also in other combinations or on their own without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic illustration of an example of a user-initiated change, brought about when using an embodiment of the proposed method, from presentation of a first view of the virtual environment to presentation of a second view of the virtual environment.

FIG. 2 shows a schematic illustration of an example of a user-initiated change, when using a further embodiment of the proposed method, from presentation of a third view of the virtual environment to presentation of a fourth view of the virtual environment.

DETAILED DESCRIPTION OF THE PREFERRED EMBODIMENT

Figure 3:
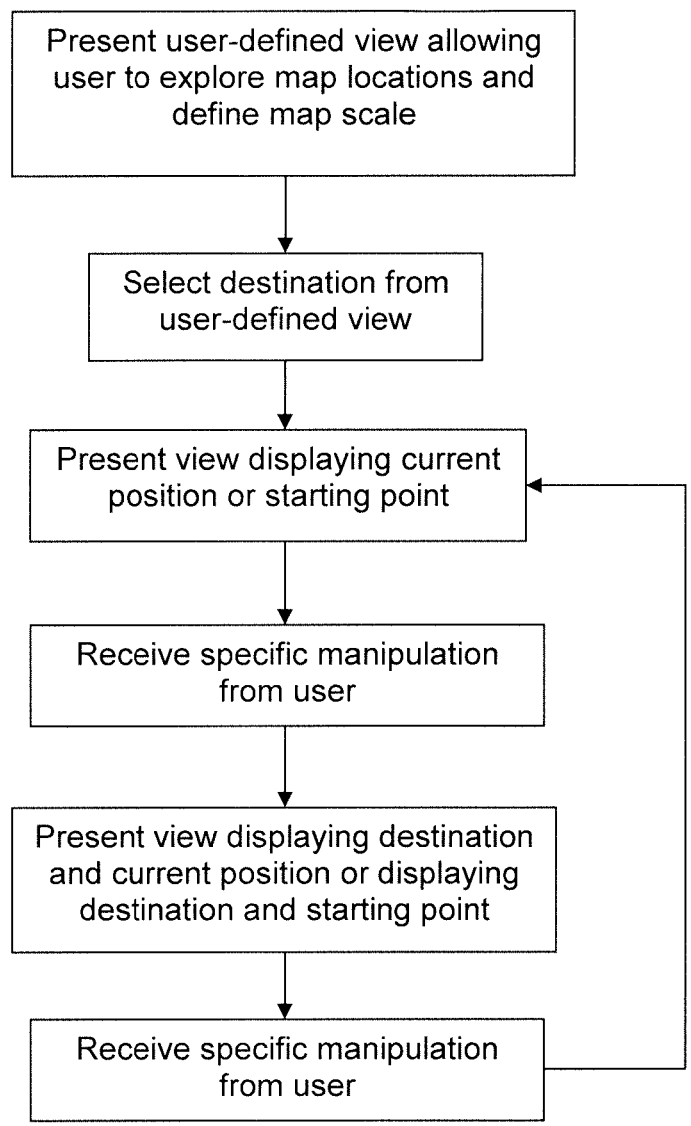
FIG. 3 shows a flowchart representing one potential embodiment of the present invention.

Reference will now be made in detail to the preferred embodiments of the present invention, examples of which are illustrated in the accompanying drawings, wherein like reference numerals refer to like elements throughout.

FIG. 1 shows a user-initiated change between a first view (1) of a virtual environment and a second view (2) of the virtual environment. The first view (1) comprises the reference point 11, which is also a starting point in a route. By virtue of unrestricted navigation in the virtual environment, the user finds a destination 12. See FIG. 3. As a result of double-tapping of a touch-sensitive panel of a display unit that is used to present the first view (1) and the second view (2), the user, as indicated by arrow 21, is directly presented the second view (2) from the first view (1), said second view using an altered scale in comparison with the first view (1), which allows the reference point 11 and the destination or intermediate destination 12 to be presented together and, as a result, also orientation of the user. Double-tapping on the touch-sensitive panel of the display medium again changes the presentation back to the first view (1), as indicated by arrow 22.

FIG. 2 shows a continuation of the interaction from FIG. 1. Whereas, in FIG. 1, the user has set up a connection to the reference point 11 from the destination 12, in FIG. 2 this is done from a different intermediate destination 13, which is at a much greater distance and, as a result, is presented in a third view (3). Double-tapping on a touch-sensitive panel of the display medium changes from the third view (3) to the new fourth view (4), as indicated by arrow 23, with the fourth view (4) being automatically scaled such that both the intermediate destination 13 and the reference point 11 are presented. Double-tapping on the touch-sensitive panel of the display medium again changes the fourth view (4), as indicated by arrow 24, back to the third view (3), in which the user can define new or further destinations or intermediate destinations if need be.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for orienting a user, comprising:
   receiving information on a reference point stipulated by a user in a virtual environment, the reference point being a current position of a user or a starting point for the user;
   presenting a display of a first view of the virtual environment on a display, the first view being a view of the reference point, the first view being automatically scaled to a preset scale;
   presenting a display of a second view of the virtual environment on the display, the second view being an overview that includes the reference point, at least one destination, and an overall area that lies between the reference point and the at least one destination;
   receiving a specific predefined manipulation from the user to change views;
   and cyclically performing a direct change between at least two views of the virtual environment on the display, the direct change between views being performed when the specific predefined manipulation is received from the user such that each time the specific predefined manipulation is received, the display switches from a current view to a next consecutive view, until a last view is displayed after which an initial view is again displayed, the at least two views of the virtual environment including the first view and the second view, wherein
   a scale change is performed during the direct change between at least two views,
   and the specific predefined manipulation is a manipulation that is predefined such that it is independent of where the reference point is shown in the second view,
   when the specific predefined manipulation is received and the cyclical direct change between at least two views is performed, the reference point is shown in the first view regardless of where the reference point is displayed in the second view, and
   the display comprises a touch-sensitive input panel.

2. The method according to claim 1, wherein
   the display is a motor vehicle display, and
   the specific predefined manipulation is received by at least one input device of the motor vehicle.

3. The method according to claim 1, wherein in changing between the at least two views, scaling is automatically set in the second view without a zoom or scroll input from the user.

4. The method according to claim 1, wherein the first view displays the reference point on a fixed scale with preset fixed degrees of latitude and longitude.

5. The method according to claim 1, wherein the specific predefined manipulation from the user comprises a double-tapping on the touch-sensitive input panel.

6. The method according to claim 1, wherein
   at least one input device is used to receive the user input to select the at least one destination and to receive the specific predefined manipulation from the user.

7. The method according to claim 1, wherein
   there are two views of the virtual environment, and
   when the display switches from the current view to the next consecutive view, the display switches from the first view to a second view after which the first view is again displayed.

8. The method according to claim 1, wherein
   the method further comprises presenting a display of a third view of the virtual environment, the third view allowing the user to explore the virtual environment.

9. The method according to claim 8, wherein
   the third view allows the user to scroll through the virtual environment and define a scale for viewing the virtual environment.

10. The method according to claim 8, wherein
    the at least one destination is selected with the third view.

11. The method according to claim 8, further comprising:
    receiving a defined user input; and
    directly switching from the third view to the first view when the defined user input is received.

12. An apparatus for exploration of a virtual environment, comprising:
a display;
an input device to receive a specific predefined manipulation from a user; a computation unit connected to the display and the input device to:
receive information on a reference point in the virtual environment, the reference point being a current position of a user or a starting point of the user;
cause the display to display a first view of the virtual environment, the first view being a view of the reference point, the first view being automatically scaled to a preset scale;
cause the display to display a second view of the virtual environment, the second view being an overview that includes the reference point, at least one destination, and an overall area that lies between the reference point and the at least one destination; and
cause the display to cyclically change directly between at least two different views of the virtual environment based on user input, such that each time the specific predefined manipulation is received, the display switches from a current view to a next consecutive view, until a last view is displayed after which an initial view is again displayed, the at least two views of the virtual environment including the first view and the second view, wherein
a scale change is performed when the display cyclically changes directly between at least two different views, and
the specific predefined manipulation is a manipulation that is predefined such that it is independent of where the reference point is shown in the second view,
when the specific predefined manipulation is received and the cyclical direct change between at least two views is performed, the reference point is shown in the first view regardless of where the reference point is displayed in the second view, and
the display comprises a touch-sensitive input panel.

13. The apparatus according to claim 12, wherein the apparatus is embodied as a navigation appliance.

14. The apparatus according to claim 12, wherein
the display comprises at least one of an LCD screen and an LED screen.

15. A method for orienting a user, comprising:
presenting a display of a first view of a virtual environment on a display, the first view being a view of a reference point, the reference point being a current position of a user or a starting point of the user, the first view being automatically scaled to a preset scale;
selecting at least one destination using an exploration view of the virtual environment,
the exploration view being scaled with a user defined scale;
presenting a display of a second view of the virtual environment on the display, the second view being an overview that includes the reference point, the at least one destination, and an overall area that lies between the reference point and the at least one destination;
receiving a specific predefined manipulation from the user to change views; and
cyclically changing between at least the first and second views of the virtual environment such that each time the specific predefined manipulation is received, the display switches from a current view to a next consecutive view, until a last view is displayed after which an initial view is again displayed, and
the specific predefined manipulation is a manipulation that is predefined such that it is independent of where the reference point is shown in the second view,
when the specific predefined manipulation is received and the cyclical direct change between at least two views is performed, the reference point is shown in the first view regardless of where the reference point is displayed in the second view, and
the display comprises a touch-sensitive input panel.

* * * * *